United States Patent [19]
Caspari et al.

[11] 4,185,008
[45] Jan. 22, 1980

[54] FLAME RETARDANT COMPOSITIONS

[75] Inventors: Gunter Caspari, Wheaton; Wassily Poppe, Lombard, both of Ill.

[73] Assignee: Standard Oil Company (Indiana), Chicago, Ill.

[21] Appl. No.: 949,654

[22] Filed: Oct. 10, 1978

[51] Int. Cl.² ............................................. C08K 5/32
[52] U.S. Cl. ........................... 260/45.8 A; 260/45.7 R; 260/45.75 W; 260/45.9 E
[58] Field of Search ............... 260/45.9 E, 45.7 RL, 260/45.8 A, 45.75 W

[56] References Cited
U.S. PATENT DOCUMENTS

| | | | |
|---|---|---|---|
| 2,491,443 | 12/1949 | Cox et al. | 260/45.9 E |
| 2,491,444 | 12/1949 | Cox et al. | 260/45.9 E |
| 3,210,321 | 10/1965 | Doyle et al. | 260/45.9 E |
| 3,427,278 | 2/1969 | Siuta | 260/45.9 E |
| 3,819,518 | 6/1974 | Endler | 428/921 |
| 3,972,820 | 8/1976 | Filter et al. | 428/921 |

Primary Examiner—V. P. Hoke
Attorney, Agent, or Firm—David E. Boone; Arthur G. Gilkes; William T. McClain

[57] ABSTRACT

This invention relates to thermoplastic resin compositions having improved oxygen index values comprising a thermoplastic resin, a nitrate containing compound and a halogenated organic compound.

11 Claims, No Drawings

FLAME RETARDANT COMPOSITIONS

This invention relates to resinous compositions having increased oxygen indexes. More particularly this invention relates to compositions comprising polymeric resins and a primary flame retardant agent together with a secondary flame retardant agent comprising certain nitrates which allows the amount of primary flame retardant agent to be reduced while maintaining or increasing the oxygen index of the composition.

Due to the increased use of thermoplastics in fabricated products and building applications, it has become necessary to reduce the flammability of these products. At the present time, lack of adequate fire retardancy is one of the principal barriers to opening of additional large markets for these materials. In addition, the increased cost resulting from the incorporation of more fire retardants along with the frequent deterioration of physical properties of the polymer have been additional barriers to commercial acceptance.

A number of test methods have been devised to measure flame resistance of resinous polymers. A partial list of the most common methods are given in J. W. Lyons, The Chemistry and Uses of Fire Retardants, Wiley-Interscience, p. 3–14(1970) incorporated herein by reference. Among these is the oxygen index test which is defined as the minimum concentration of oxygen, expressed as volume percent, in an atmosphere of oxygen and nitrogen which is needed to sustain the candle-like burning of a stick of polymer. The oxygen index for polypropylene for example is given as 17.4 in Lyons, p. 7.

Various processes for increasing the flame resistance of resinous polymers are described in Lyons. Among the most common additives are halogenated compounds that can decompose in the presence of heat to form the corresponding hydrogen halide. Examples of such halogenated compounds are chlorinated paraffin waxes containing 40% to 75% chlorine; tetrachlorophthalic anhydride; and tetrabromophthalic anhydride. To achieve a satisfactory level of flame resistance, a large amount of the halogenated compound, generally greater than 30 parts by weight per 100 parts of the polymer, is required.

The quantity of halogenated compound required can be reduced by adding another component such as antimony trioxide. However, the total additive amount (antimony compound and halogenated compound) still ordinarily ranges from 15–30 parts by weight per 100 parts by weight of the polymer. This can cause a deterioration of the polymer's mechanical properties such as yield strength, breaking load and hardness. Accordingly there is a need for new fire retardant compositions.

Other materials besides antimony oxide have been reported to reduce the amount of halogenated compound required. Bertelli and Roma in U.S. Pat. No. 4,010,139 disclose the use of bismuth compounds together with halogenated compounds capable of breaking down in the presence of heat to form the corresponding halogen halide to impart self-extinguishing properties to certain polyolefins. Typical bismuth compounds disclosed include: $BiOCl$, $Bi(NO_3)_3 \cdot 5H_2O$, $(BiO)NO_3$, $Bi_2(SO_4)_3$, $(BiO)_2SO_4$, $(BiO)_2CO_3$, $(CH_3COO)_3Bi$, basic bismuth salicylate, bismuth tellurate, bismuth titanate, bismuth halides, bismuth sulphocyanate, bismuth carbamates, triphenylbismuthine.

Certain ammonium salts and nitrogen containing compounds have been reported as fire retardants in polyamides as given in Lyons, p. 413–414. The effectiveness of each compound was correlated with the decrease in melting point of Nylon 66 which had been surface coated by having dried onto it a 10% solution of the fire retardant. The compounds used include: ammonium dihydrogen phosphate, ammonium chloride, ammonium bromide, ammonium sulfate, ammonium sulfamate, ammonium nitrate, ammonium thiocyanate and thiourea.

Although numerous compounds are known to be flame retardants, this is an empirical area since flame retardants useful in some polymer have little or no effect in others. For example, Taylor and Lutz in U.S. Pat. Nos. 3,325,563 and 3,412,052 report that polypropylene and polybutene can be rendered self-extinguishing with 4 weight percent of bis(bromochloropropyl)-bromochloropropylphosphonate whereas polyethylene with 4 weight percent of the additive burns faster than an untreated control. Further, it has been difficult to predict the interaction of two or more flame retardants. For example in Lyons, p. 321, it is reported that polystyrene may be made self-extinguishing by using 5 weight percent tris(2,3-dibromopropyl)phosphate which corresponds to 0.22 weight percent phosphorus and 3.5 weight percent bromine. When antimony trioxide is used, it is reported in Lyons p. 328 that 0.5 weight percent phosphorus, 7–8 weight percent bromine and 6–8 weight percent antimony trioxide are required to render polystyrene self-extinguishing.

The object of this invention is to provide polymeric compositions having increased flame resistance as measured by the oxygen index test. A more specific object is to maintain the oxygen index at a predetermined level while decreasing the amount of organic halogen containing compound used without increasing the total concentration of fire retardant additives. Other objects appear hereinafter.

The objects of this invention can be accomplished by a composition comprising a thermoplastic polymer, a primary flame retardant agent and a secondary flame retardant agent. The flame retardant agents are present in an amount sufficient to give the desired oxygen index. The primary flame retardant agent comprises a chlorine and/or bromine containing organic compound. The secondary flame retardant agent comprises one or more nitrates selected from the group consisting of sodium nitrate, ammonium nitrate, metal ammine nitrates and organic nitrates. Other things being equal these nitrates permit the use of lower levels of the halogenated organic compounds while maintaining or increasing the oxygen index of the polymeric composition.

The thermoplastic polymers useful in this invention include addition polymers of alpha olefins having two to eight carbon atoms, such as ethylene, propylene, 1-butene, 1-hexene, and styrene. These addition polymers include resinous homopolymers and resinous block, random or multi-segment copolymers containing up to 20 weight percent of a comonomer. These include: resinous homopolymers of ethylene, copolymers of ethylene and propylene, 1-butene or 1-hexene; substantially crystalline homopolymeric polypropylene and resinous copolymers containing ethylene or 1-butene; resinous homopolymers of styrene, copolymers of styrene and up to 20 weight percent of an ethylenically unsaturated monomer such as acrylonitrile, butadiene, α-methylstyrene, methylacrylate or maleic anhydride; and rubber-modified polystyrene which can be prepared by dispersing into the polystyrene up to about 15 weight percent of a rubber phase such as polybutadiene or styrenebutadiene copolymer.

Also useful in this invention are the resinous poly(alkylene terephthalate) condensation polymers in which the alkylene moiety has from two to four carbon atoms. Examples of these are poly(ethylene terephthalate) and poly(butylene terephthalate). These resinous condensation polymers can also have up to 20 weight percent of the terephthalic acid moiety replaced with isophthalic acid moiety.

The primary flame retardant comprises chlorine or bromine containing organic compounds effective as flame retardants in resinous polymers. Representative compounds are listed in Lyons, pages 76 through 101, which is incorporated by reference herein. Typically these compounds are substantially non-volatile at the melting point of the resinous polymer and additive composition. Such compounds usually have a molecular weight above 200, and contain 35-95% by weight halogen. These include chlorinated or brominated aliphatic compounds such as hexachloronornene-dicarboxylic anhydride and hexabromocyclododecane; and chlorinated or brominated aromatic compounds such as hexabromobenzene and tetrabromophthalic anhydride.

The amount of the bromine or chlorine containing organic compound used depends on its effectiveness in the particular resinous polymer. The amount used also depends on the nitrate selected and its concentration. Preferably the halogen containing component comprises about 2 to 20 weight percent of the resinous composition. Weight percent as used herein is defined as the parts by weight per 100 parts of the total resinous composition which includes the resinous polymer together with all flame retardants, fillers and additives such as polymer stabilizers. The optimum concentration for a particular resinous polymer and nitrate composition can be determined by routine experimentation.

It is surprising that only certain nitrates are effective in increasing the oxygen index of resinous polymer compositions containing halogenated organic components. The useful nitrates include sodium nitrate and ammonium nitrate; metal ammine nitrates such as diamminezinc nitrate; and organic nitrates such as guanidine nitrate. Our experiments indicate that other nitrates such as potassium nitrate do not increase the oxygen index of the polymeric compositions of this invention.

The quantity of nitrate component used depends not only upon the particular nitrate but also on the halogenated organic component and the resinous polymer. Ordinarily the amount of nitrate component comprises from 0.05 to 15 weight percent of the resinous composition. Preferably the nitrate component comprises from 0.1 to 5 weight percent of the resinous composition. The total amount of nitrate component and halogen containing component can range from about 3 to 22 weight percent.

The maximum amount of nitrate component which can be utilized depends upon the end use of the resinous composition. If the composition is to be compression molded, the higher levels of the nitrate component can be used without difficulty. When the resinous composition is extruded, however, foaming can occur if too high a level of ammonium nitrate is used.

The oxygen index of the resinous composition of this invention can be further increased by adding a small amount of boric acid, ammonium hydrogen phosphate, ammonium polyphosphate or mixtures thereof. Alternatively the oxygen index of the resinous composition can be maintained while the quantity of flame retardant additive is reduced by incorporating one or more of these components. The quantity of these components can comprise from about 0.5 to 5.0 weight percent of the total resinous composition. The use of ammonium polyphosphate, ammonium nitrate and tetrabromophthalic anhydride in certain resinous polymers is disclosed and claimed in Ser. No. 949,655 filed on even date, which is incorporated by reference.

The resinous composition can also contain inert fillers such as calcium carbonate, talc, glass fiber and other materials well known in the art. Stabilizers can be added to increase the resistance of the composition to degradation due to ultra-violet radiation and oxidation. Suitable stabilizers include 2,6-di-tert-butyl-p-cresol and 2,4-dihydrobenzophenone. The composition, however, must contain at least 50 weight percent of the resinous polymer to maintain the desired physical properties.

The following examples are merely illustrative and should not be construed as limiting the scope of the invention.

EXAMPLE I

Unstabilized polypropylene powder, flow rate of 4–6 grams per 10 minutes as determined per ASTM D-1238 following procedure A and condition L, was thoroughly mixed in a Waring mini-blender with tetrabromophthalic anhydride and additionally ammonium nitrate or antimony oxide. The relative amounts of the ingredients are given in Table I below. The total mass of the mixture was 15 grams.

Test specimen bars were prepared from the powder mixture as follows: a 6 inch by 6 inch piece of aluminum foil was placed on a ⅛ inch thick aluminum disc of sufficient size to accommodate the foil; a metal mold having a slot size of 100.0×8.0×3.0 millimeter was placed on the foil; the slot was filled with approximately 4 grams of the powder mixture; another piece of 6 inch by 6inch aluminum foil was placed on top of the mold; the mold was placed in a Carver, laboratory model, hydraulic press equipped with electrically heated plates; the test specimen bar was heated at 350° F. for 2 minutes; 5000 lb/in$^2$ pressure was then applied to the test specimen bar and maintained for 2 minutes with the temperature at 350° F.; the mold was extracted and cooled under cold water before extracting the 100.0×8.0×3.0 millimeter test specimen bar.

The oxygen index was determined according to the procedure of ASTM D-2863-70 using the specimen bars prepared as described above. The results are expressed as the minimum percent oxygen in an atmosphere of oxygen and nitrogen which is needed to sustain candle-like burning of the specimen bar.

The results of the oxygen index test on these mixtures are shown in Table I.

Table I

| Sample Number | Compositions* (all amounts are weight percent) | | | | Oxygen Index |
| --- | --- | --- | --- | --- | --- |
| | PP | TBPA | AN | AO | |
| 1 | 100 | | | | 18.7 |
| 2 | 95 | 5 | | | 21.0 |
| 3 | 90 | 10 | | | 22.6 |
| 4 | 80 | 20 | | | 23.4 |
| 5 | 70 | 30 | | | 24.2 |
| 6 | 92 | 4 | | 4 | 23.4 |
| 7 | 80 | 10 | | 10 | 24.2 |

Table I-continued

| Sample Number | Compositions* (all amounts are weight percent) | | | | Oxygen Index |
|---|---|---|---|---|---|
| | PP | TBPA | AN | AO | |
| 8 | 74 | 13 | | 13 | 24.8 |
| 9 | 70 | | | 30 | 19.5 |
| 10 | 99 | | 1 | | 23.0 |
| 11 | 95 | 4 | 1 | | 23.0 |
| 12 | 89 | 10 | 1 | | 26.5 |
| 13 | 86 | 13 | 1 | | 28.5 |
| 14 | 83 | 16 | 1 | | 29.6 |
| 15 | 93 | 4 | 3 | | 22.9 |
| 16 | 87 | 10 | 3 | | 26.5 |
| 17 | 81 | 16 | 3 | | 29.6 |
| 18 | 84 | 10 | 6 | | 25.7 |

*PP is polypropylene;
TBPA is tetrabromophthalitic anhydride;
AN is ammonium nitrate;
AO is antimony trioxide.

As shown in Table I the addition of ammonium nitrate allows the total quantity of flame retardant to be reduced while maintaining the oxygen index value. For example, to obtain an oxygen index of about 24, 30 weight percent tetrabromophthalic anhydride or 10 weight percent tetrabromophthalic anhydride with 10 weight percent antimony trioxide (20 weight percent total flame retardant) was required. By comparison 10 weight percent tetrabromophthalic anhydride with only 1 weight percent ammonium nitrate (11 weight percent total flame retardant) gave an oxygen index of 26.5.

In the absence of tetrabromophthalic anhydride, one weight percent ammonium nitrate in Sample 10 has essentially no effect on the oxygen index. As shown in Samples 2, 3, 4, and 5, the presence of tetrabromophthalic anhydride alone does increase the oxygen index somewhat. However, the combination of ammonium nitrate and tetrabromophthalic anhydride significantly increases the oxygen index as shown by Samples 11, 12, 13, and 14.

EXAMPLE II

This example illustrates the effect of boric acid or ammonium dihydrogen phosphate on the oxygen index. The procedure of Example I was followed in preparing compositions containing polypropylene, tetrabromophthalic anhydride, ammonium nitrate and additionally boric acid or ammonium dihydrogen phosphate. The compositions and results of the oxygen index tests are given in Table II.

Table II

| Sample Number | Composition* (all amounts are weight percent) | | | | | Oxygen Index |
|---|---|---|---|---|---|---|
| | PP | TBPA | AN | BA | AP | |
| 20 | 87 | 10 | | 3 | | 22.5 |
| 21 | 88 | 10 | 1 | 1 | | 26.8 |
| 22 | 90 | 6 | 1 | 3 | | 25.7 |
| 23 | 86 | 10 | 1 | 3 | | 29.1 |
| 24 | 87 | 10 | | | 3 | 24.3 |
| 25 | 90 | 6 | 1 | | 3 | 26.4 |
| 26 | 86 | 10 | 1 | | 3 | 27.6 |

*PP is polypropylene
TBPA is tetrabromophthalic anhydride
AN is ammonium nitrate
BA is boric acid
AP is ammonium dihydrogen phosphate As shown in Table II, ammonium nitrate is needed to give high oxygen indexes even when boric acid or ammonium dihydrogen phosphate are present. By comparison Sample 3 in Table I with 10 weight percent tetrabromophthalic anhydride had an oxygen index of 22.6 while Sample 20 in Table II with 10 weight percent tetrabromophthalic anhydride and 3 weight percent boric acid had an oxygen index of 22.5. However, Sample 23 with 10 weight percent tetrabromophthalic anhydride, 3 weight percent boric acid, and 1 weight percent ammonium nitrate had an oxygen index of 29.1.

As shown by Sample 20 and 24, ammonium dihydrogen phosphate gives a higher oxygen index than boric acid when ammonium nitrate is absent. However, as shown by Samples 23 and 26, boric acid gives a higher oxygen index at higher levels of tetrabromophthalic anhydride.

EXAMPLE III

Example III illustrates the effect of metal ammine nitrates on the oxygen index of polypropylene containing 10 weight percent tetrabromophthalic anhydride. The procedure of Example I was followed in preparing compositions containing polypropylene, tetrabromophthalic anhydride, and the metal ammine nitrate. The compositions and test results are given in Table III.

Table III

| Sample Number | (all amts. are wt. percent) | | | Nitrate** Compound | Oxygen Index |
|---|---|---|---|---|---|
| | PP | TBPA | Nitrate** | | |
| 30 | 89 | 10 | 1 | A | 26.8 |
| 31 | 87 | 10 | 3 | A | 25.8 |
| 32 | 89 | 10 | 1 | B | 27.1 |
| 33 | 87 | 10 | 3 | B | 28.1 |
| 34 | 89 | 10 | 1 | C | 23.8 |
| 35 | 87 | 10 | 3 | C | 24.2 |
| 36 | 87 | 10 | 6 | C | 24.3 |

*PP is polypropylene
TBPA is tetrabromophthalic anhydride
**Nitrate is the metal ammine nitrate: A is calcium ammine nitrate; B is ceric ammine nitrate; C is zinc ammine nitrate.

The results in Table III show that the metal ammine nitrates together with a halogen containing organic compound increase the oxygen index of polypropylene. These results should be considered in view of the oxygen index of 22.6 for Sample 3 of Table I which contained 10 weight percent tetrabromophthalic anhydride. By comparison, Sample 12 of Table I which contained 10 weight percent tetrabromophthalic anhydride and one weight percent ammonium nitrate has an oxygen index of 26.5.

EXAMPLE IV

Example IV illustrates the effect of guanidine salts on the oxygen index of polypropylene containing 10 weight percent tetrabromophthalic anhydride. The procedure of Example I was followed in preparing the compositions. The results of the tests are shown in Table IV.

Table IV

| Sample Number | Composition* (all amounts are weight percent) | | | Oxygen Index |
|---|---|---|---|---|
| | PP | TBPA | Guanidine Compound | |
| 40 | 88 | 10 | 2 parts Aminoguanidine Bicarbonate | 23.8 |
| 41 | 88 | 10 | 2 parts Guanidinecarbonate | 24.2 |
| 42 | 88 | 10 | 2 parts Aminoguanidine Nitrate | 25.8 |
| 43 | 89 | 10 | 1 part | 24.3 |

Table IV-continued

| Sample Number | Composition* (all amounts are weight percent) | | | Oxygen Index |
|---|---|---|---|---|
| | PP | TBPA | Guanidine Compound | |
| | | | Guanidine Nitrate | |

*PP is polypropylene
TBPA is tetrabromophthalic anhydride

These results show that the guanidine nitrates are more effective at increasing the oxygen index than the guanidine carbonates.

EXAMPLE V

This example illustrates the effect on the oxygen index of the compositions when hexabromobenzene is used in place of tetrabromophthalic anhydride. The procedure of Example I was followed in preparing the compositions. The results of the tests are shown in Table V.

Table V

| Sample Number | Composition* (all amts. are wt. percent) | | | | Oxygen Index |
|---|---|---|---|---|---|
| | PP | HBB | AN | AO | |
| 44 | 94 | 6 | | | 22.1 |
| 45 | 90 | 10 | | | 24.7 |
| 46 | 87 | 13 | | | 25.3 |
| 47 | 88 | 6 | | 6 | 25.2 |
| 48 | 80 | 10 | | 10 | 26.3 |
| 49 | 97 | 6 | 1 | | 24.2 |
| 50 | 89 | 10 | 1 | | 26.7 |
| 51 | 86 | 13 | 1 | | 28.6 |

*PP is polypropylene
HBB is hexabromobenzene
AN is ammonium nitrate
AO is antimony trioxide The use of one weight percent ammonium nitrate with 10 weight percent hexabromobenzene (11 weight percent total flame retardants) in Sample 50 gave an oxygen index of 26.7. By way of comparison a combination of 10 weight percent hexabromobenzene and 10 weight percent antimony trioxide (20 weight percent total flame retardants) gave an oxygen index of 26.3 in Sample 48.

EXAMPLE VI

This example illustrates the use of hexabromocyclododecane as the primary flame retardant. Table VI shows the oxygen indexes of samples containing either ammonium nitrate, zinc ammine nitrate or calcium ammine nitrate as the secondary flame retardant. The procedure in Example I was followed in preparing the compositions.

Table VI

| Sample Number | Composition* (all amts. are wt. percent) | | | Nitrate** Compound | Oxygen Index |
|---|---|---|---|---|---|
| | PP | HBD | Nitrate** | | |
| 55 | 97 | 3 | | | 21.0 |
| 56 | 90 | 10 | | | 23.7 |
| 57 | 97 | 2 | 1 | A | 23.0 |
| 58 | 93 | 6 | 1 | A | 24.2 |
| 59 | 97 | 2 | 1 | B | 24.2 |
| 60 | 93 | 6 | 1 | B | 24.8 |
| 61 | 91 | 6 | 3 | B | 25.8 |
| 62 | 97 | 2 | 1 | C | 23.6 |
| 63 | 93 | 6 | 1 | C | 24.8 |
| 64 | 91 | 6 | 3 | C | 24.3 |

*PP is polypropylene
HBD is hexabromocyclododecane
**A is ammonium nitrate
B is zinc ammine nitrate
C is calcium ammine nitrate The results in Table VI show that when ammonium nitrate, zinc ammine nitrate or calcium ammine nitrate is present in the resinous composition, the oxygen indexes are increased although the total amount of flame retardants is reduced.

EXAMPLE VII

This example shows that potassium nitrate has no effect on the oxygen index of polypropylene containing tetrabromophthalic anhydride. A composition, Sample 65, containing 89 weight percent polypropylene, 10 weight percent tetrabromophthalic anhydride and one weight percent potassium nitrate was prepared by the procedure of Example I. The oxygen index of this composition was 22.6. A composition which contained 90 weight percent polypropylene and 10 weight percent tetrabromophthalic anhydride, Sample 3 in Table I, also had an oxygen index of 22.6.

EXAMPLE VIII

This example illustrates the oxygen indexes obtained with compositions prepared from four resinous polymers when the secondary flame retardant ammonium nitrate is used together with ammonium polyphosphate.

The compositions were prepared by weighing out polymer, stabilizers, and flame retardants, and thoroughly mixing in a Waring blender. The resulting blend was extruded on a one-inch pelletizing, screw extruder having a ⅛ inch strand die maintained at 400°–425° F. This extrudate was used to mold test bars on a Frohring mini-jector at 400°–425° F. The dimensions of the test bars were: length, 4.5 inches; width, 0.256 inch; thickness, 0.118 inch.

The following base resins were used: polypropylene powder having a weight average molecular weight of approximately 450,000 as determined by gel permeation chromatography and a flow rate of 2–4 grams per 10 minutes as determined per ASTM D-1238 following procedure A and condition L; high density polyethylene with a melt index of 0.5–1.0 as determined by ASTM D-1238 condition E; crystal polystyrene with a flow rate of 3.5 grams per 10 minutes as determined by ASTM D-1238 condition G; poly(ethylene terephthalate) obtained from Goodyear Tire and Rubber Company with a designation 5041 and an intrinsic viscosity of 1.0; poly(butylene terephthalate) from Eastman Chemical Products and designated Tenite Polyterephthalate 6P4DF having an intrinsic viscosity of 1.09.

The following stabilizers were used: BHT is butylated hydroxytoluene. Argus Q328 is a mixture of distearyl thiodipropionate and the three to one condensate of 3-methyl-6-tertiary-butyl phenol with crotonaldehyde. Epon 1002 is an epoxy resin having a melting point of from 75° to 85° C. and an epoxide equivalent, in grams of resin containing one gram equivalent epoxy, of 600 to 700. The stabilizers were combined with the base polymer in the following parts by weight per 100 parts of the total composition: 0.10 BHT; 0.36 Argus Q328; 0.15 Epon 1002; 0.15 calcium stearate.

Phos Chek P/30 is ammonium polyphosphate.

Difficulties were encountered in extruding some composition. A polyethylene composition containing 10 weight percent tetrabromophthalic anhydride, 2 weight percent ammonium polyphosphate and 1 weight percent ammonium nitrate foamed and spit during extrusion while such a composition in which the ammonium nitrate level was 0.4 weight percent was extruded without difficulty. A poly(ethylene terephthalate) composition which contained 10 parts tetrabromophthalic anhydride per 100 parts of the composition could not be extruded in that not enough back pressure could be developed.

The results of the oxygen index test on these compositions are shown in Table VII.

Table VII

| Sample Number | PP* | PE* | PS* | PBT* | TBPA* | Phos* Chek P/30 | $NH_4NO_3$ | Oxygen Index |
|---|---|---|---|---|---|---|---|---|
| 70 | 90 | — | — | — | 10 | — | — | 21.6 |
| 71 | 88 | — | — | — | 10 | 2 | — | 26.5 |
| 72 | 87.8 | — | — | — | 10 | 2 | 0.2 | 26.1 |
| 73** | 87.8 | — | — | — | 10 | 2 | 0.2 | 26.5 |
| 74 | — | 100 | — | — | — | — | — | 19.5 |
| 75 | — | 90 | — | — | 10 | — | — | 19.9 |
| 76 | — | 98 | — | — | — | 2 | — | 19.9 |
| 77 | — | 88 | — | — | 10 | 2 | — | 21.3 |
| 78 | — | 87.8 | — | — | 10 | 2 | 0.2 | 22.0 |
| 79** | — | 87.8 | — | — | 10 | 2 | 0.2 | 25.0 |
| 80** | — | 81.7 | — | — | 15 | 3 | 0.3 | 25.0 |
| 81** | — | 75.6 | — | — | 20 | 4 | 0.4 | 25.5 |
| 82 | — | — | 100 | — | — | — | — | 18.2 |
| 83 | — | — | 90 | — | 10 | — | — | 22.0 |
| 84 | — | — | 98 | — | — | 2 | — | 18.2 |
| 85 | — | — | 88 | — | 10 | 2 | — | 22.8 |
| 86 | — | — | 87.8 | — | 10 | 2 | 0.2 | 24.5 |
| 87** | — | — | 87.8 | — | 10 | 2 | 0.2 | 26.5 |
| 88** | — | — | 81.7 | — | 15 | 3 | 0.3 | 26.5 |
| 89** | — | — | 75.6 | — | 20 | 4 | 0.4 | 26.5 |
| 90 | — | — | — | 100 | — | — | — | 21.6 |
| 91 | — | — | — | 90 | 10 | — | — | 23.6 |
| 92 | — | — | — | 98 | — | 2 | — | 22.3 |
| 93 | — | — | — | 88 | 10 | 2 | — | 23.6 |
| 94 | — | — | — | 87.8 | 10 | 2 | 0.2 | 25.0 |
| 95** | — | — | — | 87.8 | 10 | 2 | 0.2 | 25.5 |
| 96** | — | — | — | 81.7 | 15 | 3 | 0.3 | 27.1 |
| 97** | — | — | — | 75.6 | 20 | 4 | 0.4 | 31.2 |

*PP: Polypropylene
PE: High density polyethylene
PS: Polystyrene
PBT: Poly(butylene terephthalate)
TBPA: tetrabromophthalic anhydride
Phos Chek P/30: Ammonium polyphosphate
**These samples were prepared and the oxygen index determined at a different time than the other samples.

There can be some variation in the oxygen index values due to operator technique and other variables. Since some of the values in Table VII were determined at a different time, duplicate samples were included. While there was good agreement between Samples 72 and 73 and also Samples 94 and 95, there were differences between Samples 78 and 79 as well as Samples 86 and 87. With both the high density polyethylene and polystyrene compositions, the oxygen indexes did not increase when the amount of flame retardants was increased. However, the oxygen indexes of the poly(butylene terephthalate) compositions did increase when the quantity of flame retardants was increased. The oxygen indexes of all of the resinous polymers were increased when ammonium nitrate and ammonium polyphosphate were present.

EXAMPLE IX

This example illustrates the effect of four nitrate salts on the oxygen indexes of polypropylene compositions. The samples were prepared by the procedure of Example VIII and included the stabilizers contained therein. Polypropylene was used as the base resin in this example and all samples contained 10 weight percent tetrabromophthalic anhydride and 2 weight percent Phos Chek P/30 (ammonium polyphosphate) together with the nitrate.

Table VIII

| Nitrate | Concentration (Weight Percent) | Oxygen Index |
|---|---|---|
| $Ca(NO_3)_2 \cdot 4H_2O$ | 0.2 | 26.1 |
| " | 0.4 | 26.5 |
| " | 0.6 | 26.1 |
| " | 0.8 | 26.1 |
| " | 1.0 | 27.1 |
| $NaNO_3$ | 0.2 | 26.5 |
| " | 0.4 | 26.1 |
| " | 0.6 | 28.9 |
| " | 0.8 | 27.9 |
| " | 1.0 | 29.4 |
| $KNO_3$ | 0.2 | 26.1 |
| " | 0.4 | 26.5 |
| " | 0.6 | 26.5 |
| " | 0.8 | 27.7 |
| $NH_4NO_3$ | 0.2 | 26.1 |
| " | 0.4 | 27.4 |
| " | 0.6 | 27.7 |
| " | 0.8 | 27.1 |

Table VIII-continued

| Nitrate | Concentration (Weight Percent) | Oxygen Index |
|---|---|---|
| " | 1.0 | 27.9 |

The results of Table VIII show that both sodium nitrate and ammonium nitrate increase the oxygen indexes of the compositions while the potassium nitrate and calcium nitrate had little or no effect. A composition, Sample 71 of Table VII, comprising 88 weight percent polypropylene, 10 weight percent tetrabromophthalic anhydride and two weight percent ammonium polyphosphate had an oxygen index of 26.5. The results with potassium nitrate should also be compared with Example VII where no increase in oxygen index was observed with a compression molded sample containing potassium nitrate.

We claim:
1. A composition comprising:
   (a) a thermoplastic polymer and at least one primary flame retardant consisting of a chlorine or bromine containing organic compound;
   (b) a secondary flame retardant agent in an amount sufficient to give an improved oxygen index, said agent comprising: about 0.05 to about 15 weight percent of one or more nitrate containing compounds selected from the group consisting of sodium nitrate, ammonium nitrate, metal ammine nitrates and guanidine nitrates.
2. The composition of claim 1 wherein said thermoplastic polymer is an addition polymer.
3. The composition of claim 2 wherein said addition polymer is a resinous polymer of propylene.
4. The composition of claim 2 wherein said nitrate is sodium nitrate or ammonium nitrate.
5. The composition of claim 1 wherein said thermoplastic polymer is a poly(alkylene terephthalate).
6. The composition of claim 5 wherein said poly(alkylene terephthalate) contains up to 20 weight percent isophthalic acid.
7. The composition of claim 5 wherein said poly(alkylene terephthalate) is poly(ethylene terephthalate) or poly(butylene terephthalate).
8. The composition of claim 5 wherein said nitrate is sodium nitrate or ammonium nitrate.
9. A composition comprising a resinous polymer of propylene, 2.0 to 20 parts by weight tetrabromophthalic anhydride, and 0.1 to 3.0 parts by weight ammonium nitrate.
10. A composition comprising a resinous polymer of styrene, 2 to 20 parts by weight tetrabromophthalic anhydride, and 0.1 to 3 parts by weight ammonium nitrate.
11. A composition comprising a resinous homopoly(butylene terephthalate), 2 to 20 parts by weight tetrabromophthalic anhydride and 0.1 to 3 parts by weight ammonium nitrate.

* * * * *

UNITED STATES PATENT OFFICE
CERTIFICATE OF CORRECTION

Patent No. 4,185,008    Dated   January 22, 1980

Inventor(s)   G. Caspari and W. Poppe

It is certified that error appears in the above-identified patent and that said Letters Patent are hereby corrected as shown below:

Column 5, line 7, In "Table I-continued", Sample Number 10, "23.0" should be -- 19.2 --.

Column 10, line 64, In Table VIII, in the $KNO_3$ group, "1.0" should be added under the heading "Concentration (Weight Percent) and "26.5" should be added under the heading "Oxygen Index".

Signed and Sealed this

Twenty-seventh Day of May 1980

[SEAL]

Attest:

SIDNEY A. DIAMOND

Attesting Officer            Commissioner of Patents and Trademarks